US008861327B2

(12) United States Patent
Prothero et al.

(10) Patent No.: US 8,861,327 B2
(45) Date of Patent: Oct. 14, 2014

(54) METHODS AND SYSTEMS FOR COMMUNICATING

(75) Inventors: Jerrold D. Prothero, Washington, DC (US); Nigel Jones, Frederick, MD (US)

(73) Assignee: Astrapi Corporation, Dallas, TX (US)

( * ) Notice: Subject to any disclaimer, the term of this patent is extended or adjusted under 35 U.S.C. 154(b) by 234 days.

(21) Appl. No.: 13/447,641

(22) Filed: Apr. 16, 2012

(65) Prior Publication Data

US 2012/0263031 A1 Oct. 18, 2012

Related U.S. Application Data

(60) Provisional application No. 61/475,802, filed on Apr. 15, 2011.

(51) Int. Cl.
*H04J 9/00* (2006.01)
*H04J 7/00* (2006.01)
*H04L 27/34* (2006.01)
*H04L 27/00* (2006.01)

(52) U.S. Cl.
CPC ........ *H04L 27/3494* (2013.01); *H04L 27/0004* (2013.01)
USPC .......................................... 370/204; 370/203

(58) Field of Classification Search
USPC ................................. 370/203, 204
See application file for complete search history.

(56) References Cited

U.S. PATENT DOCUMENTS

| | | | |
|---|---|---|---|
| 5,920,238 A | 7/1999 | Cairns | |
| 6,349,272 B1 | 2/2002 | Phillips | |
| 7,327,803 B2 | 2/2008 | Sorrells et al. | |
| 7,355,470 B2 | 4/2008 | Sorrells et al. | |
| 7,647,030 B2 | 1/2010 | Sorrells et al. | |
| 2002/0122505 A1 | 9/2002 | Avidor et al. | |
| 2003/0067990 A1 | 4/2003 | Bryant | |
| 2005/0021319 A1 | 1/2005 | Li et al. | |
| 2006/0039455 A1 | 2/2006 | Cairns et al. | |
| 2007/0195952 A1 | 8/2007 | Singanamala | |
| 2008/0095121 A1* | 4/2008 | Shattil | 370/335 |
| 2008/0130714 A1 | 6/2008 | Wilborn et al. | |
| 2011/0150048 A1 | 6/2011 | Prothero | |

OTHER PUBLICATIONS

International Search Report and Written Opinion dated Oct. 29, 2012, aas issued in corresponding International Patent Application No. PCT/US2012/033747, filed Apr. 16, 2012.

J.D. Prothero (2007), Euler's Formula for Fractional Powers of i. Available at http://www.scribd.com/doc/7127722/Eulers-Formula-for-Fractional-Powers-of-i.

\* cited by examiner

*Primary Examiner* — Kenny Lin
(74) *Attorney, Agent, or Firm* — Maier & Maier, PLLC

(57) ABSTRACT

Methods and systems for communicating are disclosed. A method includes obtaining input communication symbols selected from a set of communication symbols, converting input communication symbols into transmittable waveforms using non-periodic functions, and transmitting transmittable waveforms over a communication channel. Another method includes receiving transmittable waveforms constructed using non-periodic functions and transmitted over a communication channel, and demodulating transmittable waveforms. A system includes a modulator adapted to obtain input communication symbols selected from a set of communication symbols and adapted to convert input communication symbols into transmittable waveforms using non-periodic functions, and a transmitter or transceiver adapted to transmit transmittable waveforms over a communication channel. Another system includes a receiver or transceiver adapted to receive transmittable waveforms transmitted over a communication channel and constructed using non-periodic functions, and a demodulator adapted to demodulate transmittable waveforms.

53 Claims, 8 Drawing Sheets

METHODS AND SYSTEMS FOR COMMUNICATING

CROSS-REFERENCE TO RELATED APPLICATIONS

This application claims priority to U.S. Provisional Application 61/475,802, filed Apr. 15, 2011 and entitled TELECOMMUNICATION SIGNALING ENHANCEMENTS BASED ON DIRECTIONAL INFORMATION POWER OPTIMIZATION, AND OTHER CONSIDERATIONS, the entire contents of which are hereby incorporated by reference.

U.S. Patent Application Publication No. 2011/0150048, published Jun. 23, 2011 and entitled TELECOMMUNICATION SIGNALING USING NONLINEAR FUNCTIONS, is also incorporated by reference.

BACKGROUND

The following generalizations of Euler's formula are known in the art:

$$f_m(t) = e^{t \cdot \cos(2^{1-m}\pi)} e^{i \cdot t \sin(2^{1-m}\pi)} \quad (1)$$

$$f_m(t) = e^{ti(2^{2-m})} \quad (2)$$

In these equations, i is the imaginary constant equal to $\sqrt{-1}$, t is the time parameter, and m has the effect of varying the geometry of the curve. m=2 corresponds to a complex circle, as the above reduce to the Euler term $e^{ti}$. Known telecommunication signaling techniques such as the Quadrature Amplitude Modulation technique ("QAM technique") are based on complex circles. Values of m>2 correspond to complex spirals of increasingly rapid growth, and increasingly lower frequency.

SUMMARY

An exemplary method for communicating may include obtaining input communication symbols selected from a set of communication symbols, converting input communication symbols into transmittable waveforms using non-periodic functions, and transmitting transmittable waveforms over a communication channel.

Another exemplary method for communicating may include receiving transmittable waveforms constructed using non-periodic functions and transmitted over a communication channel, and demodulating transmittable waveforms.

An exemplary system for communicating may include a modulator adapted to obtain input communication symbols selected from a set of communication symbols and adapted to convert input communication symbols into transmittable waveforms using non-periodic functions, and a transmitter or transceiver adapted to transmit transmittable waveforms over a communication channel.

Another exemplary system for communicating may include a receiver or transceiver adapted to receive transmittable waveforms transmitted over a communication channel and constructed using non-periodic functions, and a demodulator adapted to demodulate transmittable waveforms.

BRIEF DESCRIPTION OF THE FIGURES

The present embodiments are illustrated by way of example and not limitation in the figures of the accompanying drawings, in which like references indicate similar elements.

DETAILED DESCRIPTION

Figure 1A:
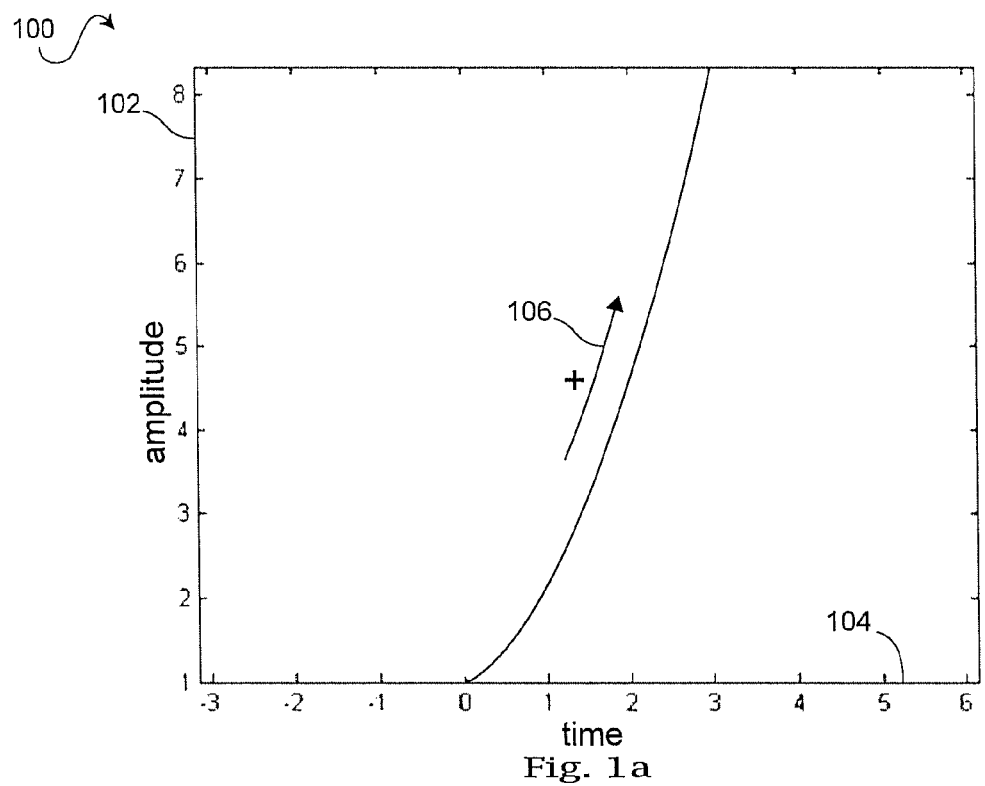
FIG. 1a illustrates an exemplary graph of the variation of signal amplitude against positive time for a signal generated by an exemplary embodiment.

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein may be performed by specific circuits (e.g., application specific integrated circuits (ASICs)) and/or by program instructions executed by at least one processor. Additionally, the sequence of actions described herein may be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for some of the embodiments described herein, the corresponding form of such embodiments may be described herein as, for example, "a computer configured to" perform some of the described action.

A periodic function is one that repeats its values at regular intervals or periods. The cosine and sine functions, which are periodic, are widely used in telecommunications. While periodic functions have the benefit of simplicity, non-periodic functions are more general and diverse. This greater diversity may be used in telecommunications for purposes that may include increasing the differentiation between signals, which may allow an increase in the data transmission rate or improved noise resistance. It may also reduce interference with other signals. Equation 1 and Equation 2 generate non-periodic functions: they may describe spirals whose amplitudes increase continually over time. Spirals may be viewed as fundamental components from which general non-periodic functions can be constructed. Many possible variations of the waveforms in Equation 1 and Equation 2 may be obtained by introducing multiplicative constants and phase shifts at each of three levels in Equation 2. Time offsets may also be possible. This may be exemplified by the "general spiral formula":

$$f_m(t) = [\kappa_0 e^{i\omega_0}] e^{[\kappa_1 e^{i\omega_1}](t+t_0)^{i[\kappa_2 e^{i\omega_2}](2^{2-m})}} \tag{3}$$

In Equation 3, a "first level" may refer to $[\kappa_0 e^{i\omega_0}]$ wherein $\kappa_0$ may be varied for amplitude modulation, and $\omega_0$ may be varied for phase modulation.

A "second level" may refer to $[\kappa_1 e^{i\omega_1}](t+t_0)$, wherein varying $\kappa_1$ may be used for frequency modulation, and generally $\kappa_1$ and $\omega_1$ may be varied for time reversal. "Time reversal" may refer to reversing the direction in which a curve is traversed. In the instance of a spiral curve, it may refer to whether the curve "spirals outwards" (positive time direction) or "spirals inwards" (negative time direction). The use of time reversal may be used to double the number of distinct symbols that can be defined under specified channel conditions, and therefore may be used to either increase the data transmission rate or to increase noise resistance. For example, time reversal may be accomplished by using $\kappa_1=\pm 1$, or equivalently $\omega_1=0$ and $\omega_1=\pi$. Further, time shifts may be accomplished by using multiple values of $t_0$.

A "third level" may refer to $[\kappa_2 e^{i\omega_2}](2^{2-m})$, wherein $\kappa_2$ and $\omega_2$ may be varied for rotational reversal. For example, rotational reversal may be accomplished by using $\kappa_2=\pm 1$, or equivalently $\omega_2=0$ and $\omega_2=\pi$. Further, m may be varied for waveform shape modulation. Higher values of m≥2 may correspond to more rapid growth and lower frequency. Other variations may involve the values of $\kappa_2$, $\omega_1$ and $\omega_2$, for example, to alternatively specify exponential growth and rotational speed properties of a spiral.

As opposed to the QAM technique, implementations of the general spiral formula as described herein may allow the number of possible signals to be doubled through the use of time reversal (as described below), and, with the use of two-component transmission (as described below), to be doubled again through the use of rotational reversal.

Additional benefits of an implementation of the general spiral formula, as used in exemplary embodiments, may arise from improved use of available power, in two ways: firstly, through the ability to engineer the signal "crest factor" (ratio of peak to average amplitude) in this system to improve signal noise resistance, and secondly, through the use of an improvement over standard "superimposed transmission" that may allow an effective improvement by a factor of two in power per signal. The signal crest factor for a standard cosine or sine wave, measured over a complete cycle, may be equal to the square root of two. An implementation of the general spiral formula, as used in exemplary embodiments, that increases the crest factor may allow a higher peak amplitude for the same constrained average power, which may be useful for some applications to improve noise resistance. An implementation of the general spiral formula, as used in exemplary embodiments, that decreases the crest factor may be useful for some applications that benefit from a higher average power subject to a constraint on maximum power. Standard superimposed transmission, as may be used by the QAM technique, may require adding together cosine and sine waves. This addition may produce a superimposed wave with amplitude greater than either the cosine or sine wave by a factor of the square root of two, and therefore a power usage that may be higher by a factor of two. An implementation of the general spiral formula, as used in exemplary embodiments, may avoid adding a cosine and sine wave and may therefore reduce power requirements by a factor of two when compared to the QAM technique.

Unlike the sine and cosine functions used in traditional signal modulation, a property of an implementation of the general spiral formula as the modulation technique in exemplary embodiments described herein, is that it may generate highly non-periodic waveforms. Specifically, the waveforms may not return to the same phase and amplitude at regular intervals as sine and cosine functions do. While a spiral modulation signal may have a well-defined frequency, its amplitude changes continually over time. This fact may increase the ability to perform signal differentiation, and therefore may contribute to improved noise resistance.

Dropping the square brackets for conciseness, the general spiral formula (Equation 3) may be written as, $$f_m(t) = \kappa_0 e^{i\omega_0} e^{\kappa_1 e^{i\omega_1}(t+t_0)^{i\kappa_2 e^{i\omega_2}(2^{2-m})}} \tag{4}$$

Equation 4 may be understood by considering special cases. By setting, $$\kappa_0=1;\ \kappa_1=\pm\omega;\ \kappa_2=1;\ \omega_0=\omega_1=\omega_2=0;\ m=3 \tag{5}$$

Equation 4 reduces to, $$f_3(t) = e^{\pm\omega(t+t_0)i^{(2^{-1})}} \tag{6}$$

By using the identity, $$e^{i\pi/2}=i \tag{7}$$

and Euler's formula, $$e^t = \cos(t)+i\cdot\sin(t) \tag{8}$$

Equation 6 may be rewritten as, $$f_3(t) = e^{\pm\omega(t+t_0)[\cos(\frac{\pi}{4})+i\ \sin(\frac{\pi}{4})]} \tag{9}$$

which may be expressed as two factors, $$f_3(t) = e^{\pm \omega(t+t_0)/\sqrt{2}} e^{\pm i\omega(t+t_0)/\sqrt{2}} \quad (10)$$

The first factor describes exponential amplitude change, and the second factor describes circular motion in the complex plane. Combined, they describe a spiral in the complex plane.

Equation 10 may be used to study the effect of reversing the direction of the time parameter in the general spiral formula. If the amplitude of Equation 10 is plotted against time for the values ω=+1; $t_0$=0; 0≤t≤3, as in exemplary FIG. 1a, it yields a rising exponential. This curve may be time-reversed by setting ω=−1. Additionally setting $t_0$=−3 causes the spiral to start at a high amplitude, from which it decreases by spiraling inward, as in exemplary FIG. 1b.

FIG. 1a shows a plot 100 of an exemplary embodiment of a signal corresponding to Equation 10. A vertical axis 102 represents signal amplitude, a horizontal axis 104 represents symbol time, and an arrow 106 indicates the positive time direction.

Figure 1B:
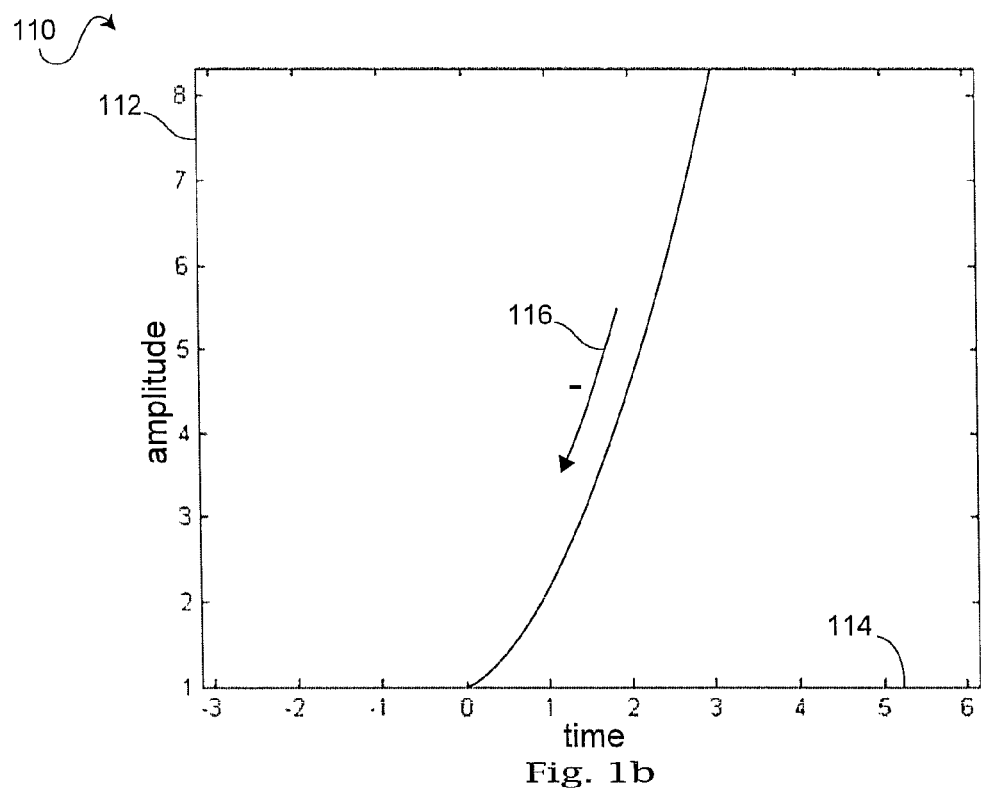
FIG. 1b illustrates an exemplary graph of the variation of signal amplitude against negative time for a signal generated by an exemplary embodiment.

FIG. 1b shows a plot 110 of an exemplary embodiment of a signal corresponding to Equation 10. A vertical axis 112 represents signal amplitude, a horizontal axis 114 represents symbol time, and an arrow 116 indicates the negative time direction.

FIGS. 1a and 1b represent signals that may be distinguished by their different patterns of amplitude change over time, independent of peak amplitude, frequency, or phase information. Signal differentiation using time direction may be possible in implementations of the general spiral formula. By contrast, signal differentiation using time direction may not be possible using the QAM technique, in which each signal's complex amplitude is constant throughout its duration.

In addition to time direction, for a spiral it is also independently possible to distinguish or specify the direction of rotation. This is shown in FIGS. 2a and 2b.

Figure 2A:
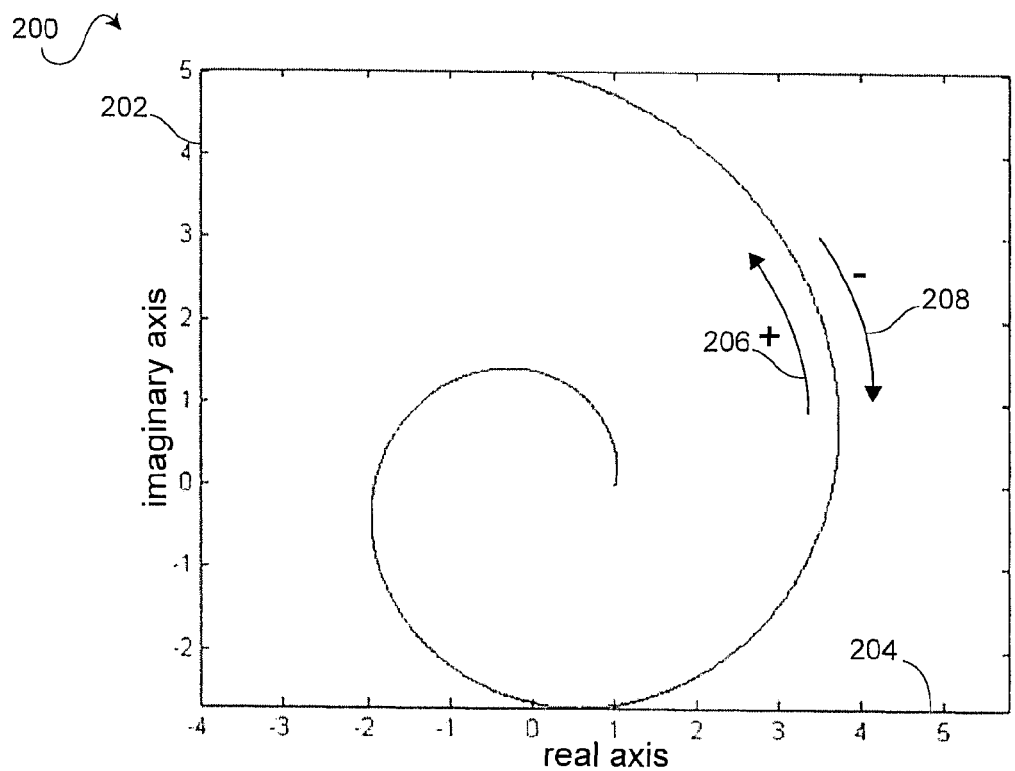
FIG. 2a illustrates an exemplary graph of a spiral with positive rotation plotted in the complex plane.

FIG. 2a shows a plot 200 in the complex plane of an exemplary embodiment of a spiral with positive (or counterclockwise) rotation. The plot shows an imaginary axis 202 and a real axis 204. A first arrow 206 indicates a positive time direction, and a second arrow 208 indicates a negative time direction.

Figure 2B:
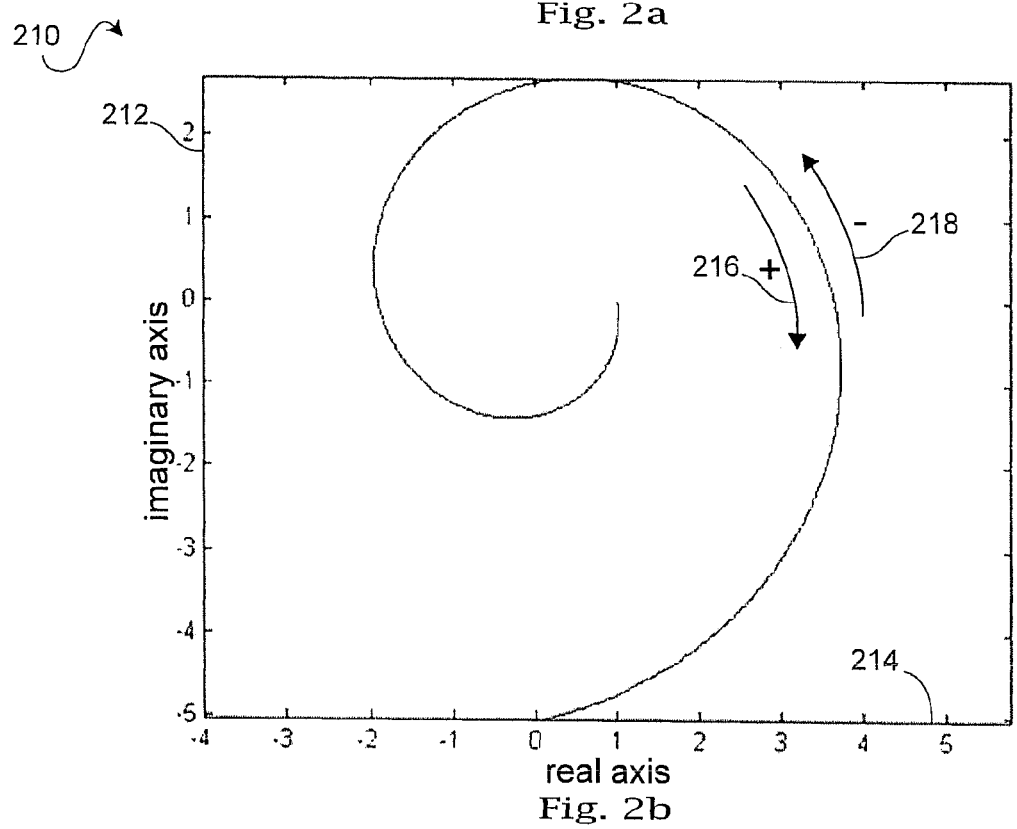
FIG. 2b illustrates an exemplary graph of a spiral with negative rotation plotted in the complex plane.

FIG. 2b shows a plot 210 in the complex plane of an exemplary embodiment of a spiral with negative (or clockwise) rotation. The plot shows an imaginary axis 212 and a real axis 214. A first arrow 216 indicates a positive time direction, and a second arrow 218 indicates a negative time direction.

As may be seen from FIGS. 2a and 2b, time direction and rotational direction may be independently specified for spirals. However, for a circle, which is the special case of a spiral where the amplitude does not vary, rotational direction and time direction are the same thing. For a circle, one cannot distinguish changing a positive rotation parameter to negative from changing a forward time parameter to the backward direction. This is illustrated in exemplary FIG. 3.

Figure 3:
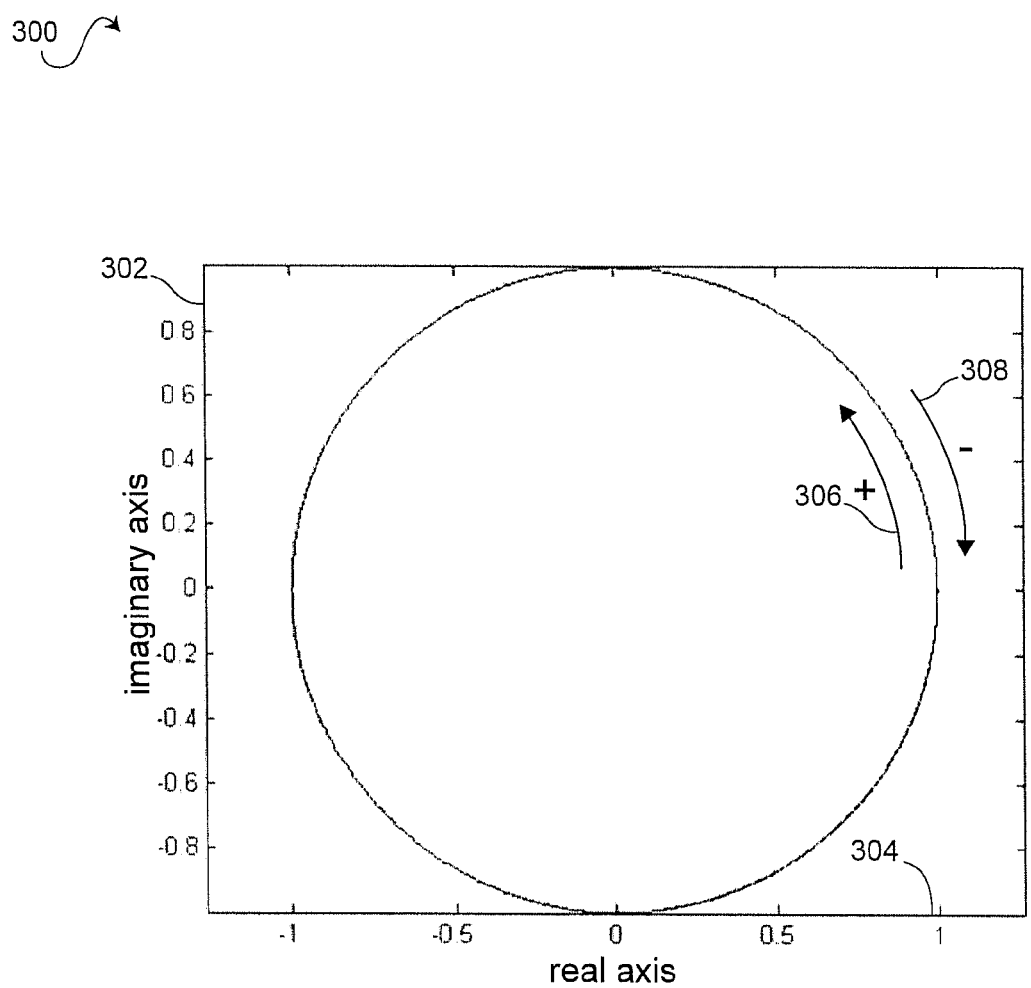
FIG. 3 illustrates an exemplary graph showing a circle plotted in the complex plane.

FIG. 3 shows a plot 300 in the complex plane of an exemplary embodiment of a circle. The plot shows an imaginary axis 302 and a real axis 304. A first arrow 306 indicates a positive time direction and a positive rotation direction. A second arrow 308 indicates a negative time direction and a negative rotation direction.

The strong time-direction differentiation, provided by the general spiral formula may make it possible to use time reversal. Implementations of the general spiral formula may support at least twice as many signals as the QAM technique does, for the same channel conditions, which may include specific bandwidth limitations and channel impairments, and available signal power, by defining signals using both the forward and backward time directions. Signals may be defined by specifying parameters in the general spiral formula, with time-reversed pairs of signals created by setting $\kappa_1$=±1, as described above.

As with existing digital modulation techniques such as the QAM technique, "pulse-shaping filter" techniques known in the art may be used with the spiral modulation technique to minimize "inter-channel interference" (ICI) between adjacent frequency ranges, while controlling "inter-symbol interference" (ISI) between successive symbols.

An additional technique for controlling ICI and ISI may be to restore the channel to its initial conditions after each symbol is transmitted. This may be accomplished by splitting the "symbol time" into a "head function" (that conforms to the general spiral formula) and a "tail function" that returns the channel to its initial conditions. An example of this is shown in exemplary FIG. 4, which corresponds to a symbol waveform with m=3. "Symbol time" may refer to the duration of the transmitted waveform representing a symbol, including the time to transmit the "head function" waveform and (if there is one) the "tail function" waveform. The "head function" waveform may correspond to the usual symbol waveform in techniques familiar to the art. The "tail function" may provide a means to compensate for the amplitude change associated with a spiral by counteracting the amplitude change of the head function and smoothly returning the channel to its initial amplitude before the start of the symbol waveform.

Figure 4:
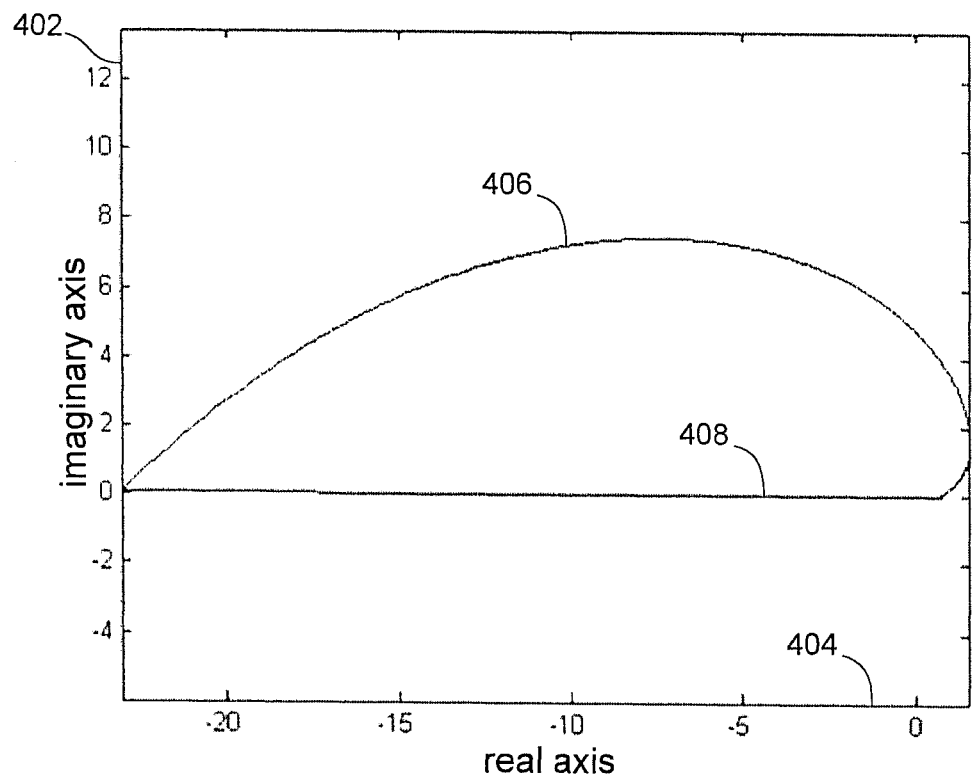
FIG. 4 illustrates an exemplary graph plotted in the complex plane showing a signal head function combined with a tail function returning the channel to its initial conditions for a signal generated by an exemplary embodiment.

FIG. 4 shows a plot 400 in the complex plane of an exemplary embodiment of a signal with m=3. The plot shows imaginary axis 402 and a real axis 404. The head 406 of the signal may include an increasing spiral. The tail 408 of the signal may return the channel to its pre-signal conditions.

The use of various tail functions with the spiral modulation technique may be chosen for various engineering reasons. Generally, assigning more time to the tail function may allow for a smoother transition, reducing frequency spread associated with discontinuities. Possible tail functions that may be implemented may include, but are not limited to, linear, exponential decay, and sigmoidal, which would be implemented in ways well known in the art. The use of different tail functions by different signals may be used to improve the distinguishability of signals, and therefore to increase noise resistance.

The "crest factor" of a signal is defined to be the ratio of its peak amplitude to its average (RMS) amplitude. For signals based on cosine or sine waves of constant amplitude measured over complete cycles, the crest factor is always equal to the square root of two.

Since exponential curves grow increasingly rapidly over time, signals based on the general spiral formula may have much higher crest factors than do sine waves. Increasing the value of m in the spiral formula may increase the crest factor to an arbitrarily high value.

For applications that are limited by average power usage, such as satellite or mobile communication, this ability to manipulate the crest factor may be quite useful. A higher crest factor may allow the same amount of average power to produce higher peak signal amplitude, which may improve noise resistance by providing signal data that has much higher amplitude than channel noise, facilitating accurate readings. A higher crest factor may be associated with a convex amplitude versus time graph, that is, one that "bends upwards". The amplitude versus time graph for Equation 4 is convex.

There may also be applications for which it may be desired to lower the crest factor, so that the average power is closer to the peak power than is the case for sine waves. This may be useful for communication embodiments in which peak power is limited but average power is not, in which case raising the average power with respect to the peak power may improve noise resistance. A lower crest factor may also be useful for applications in which it is desired to efficiently produce noise to interfere with signal transmission, where the higher average power facilitates crisscrossing with the signal to be interfered with. A lower crest factor may be obtained by various adjustments to the general spiral formula. These adjustments may include starting with convex symbol waveforms generated by the general spiral formula, then reflecting the amplitude vs. time graph of each symbol waveform across the horizontal line corresponding to half peak amplitude. This may convert an amplitude graph that is "usually low" into an amplitude graph that is "usually high". The effect may be to move the symbol waveform average power much closer to the peak power, thus lowering the crest factor.

As previously discussed, the general spiral formula may allow for a doubling of the number of possible symbols through time reversal: that is, by a choice of which direction the points in the symbol's waveform are traversed. For a spiral, "time reversal" may correspond to a choice between spiraling inwards or outwards. It may also be possible to double the number of possible symbols again by using rotational reversal. "Rotational reversal" may correspond to a choice between rotating a spiral clockwise or counterclockwise in the complex plane. As with time reversal, the extra differentiation provided by rotational reversal can be used to either increase the data rate or improve noise resistance.

Using both time reversal and rotational reversal, it may be possible to generate four quite distinct sequences of points. This is illustrated in exemplary FIG. 5a-5d.

Figure 5A:
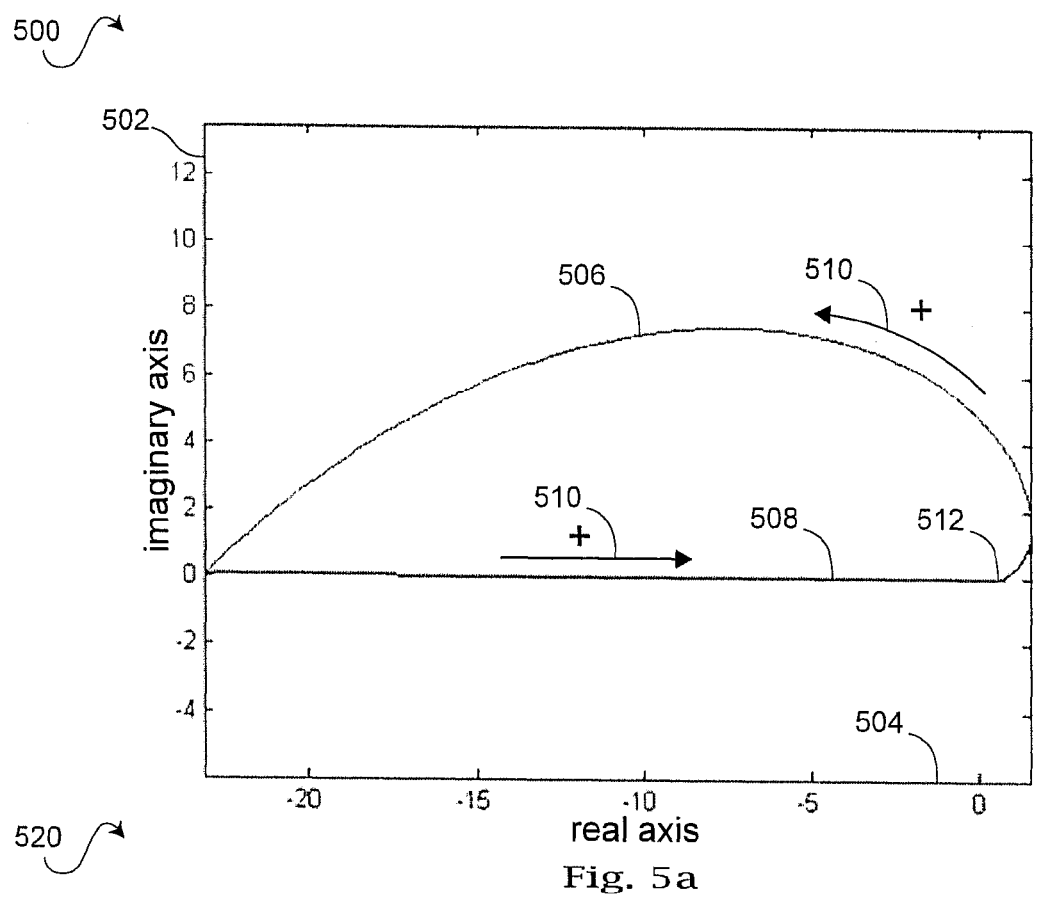
FIG. 5a illustrates an exemplary graph plotted in the complex plane of a signal generated by an exemplary embodiment with positive time direction and positive direction of rotation.

FIG. 5a shows a plot 500 in the complex plane of an exemplary embodiment of a signal with positive time direction and positive rotation. The plot shows an imaginary axis 502 and a real axis 504. The head 506 of the signal may include an increasing spiral. The tail 508 of the signal may return the channel to its pre-signal conditions. Arrows 510 may indicate the direction of time, and point 512 indicates the starting point of the signal in the complex plane.

Figure 5B:
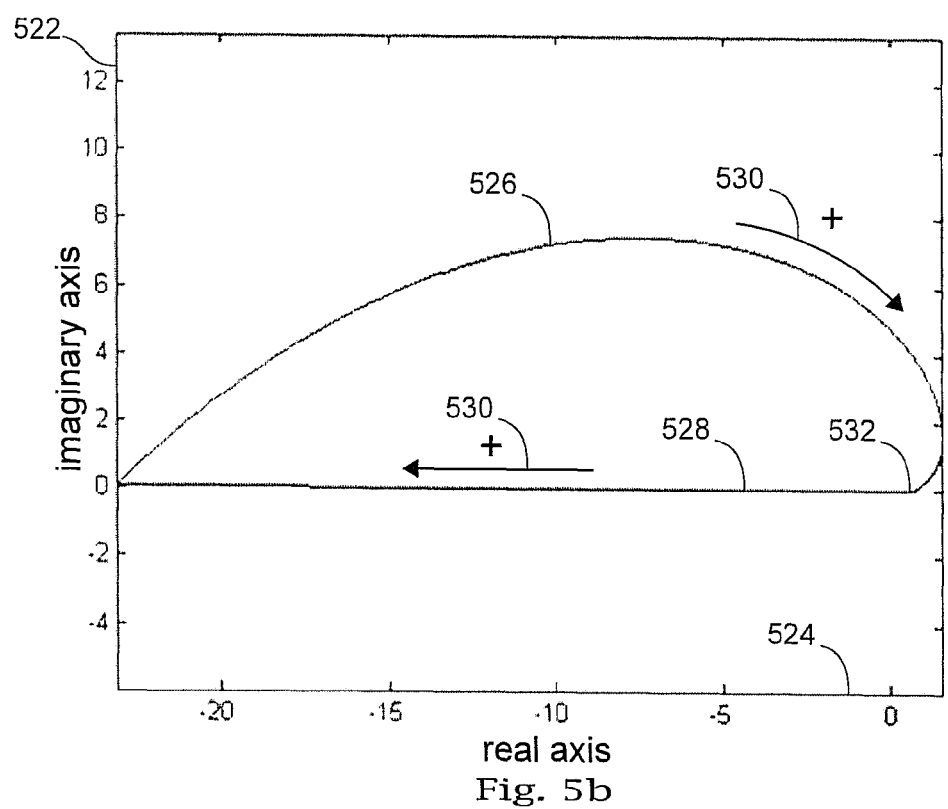
FIG. 5b illustrates an exemplary graph plotted in the complex plane of a signal generated by an exemplary embodiment with negative time direction and positive direction of rotation.

FIG. 5b shows a plot 520 in the complex plane of an exemplary embodiment of a signal with negative time direction and positive rotation. The plot shows an imaginary axis 522 and a real axis 524. The head 526 of the signal may include a decreasing spiral. The tail 528 of the signal may raise the channel from its pre-signal conditions. Arrows 530 indicate the direction of time, and point 532 indicates the starting point of the signal in the complex plane.

Figure 5C:
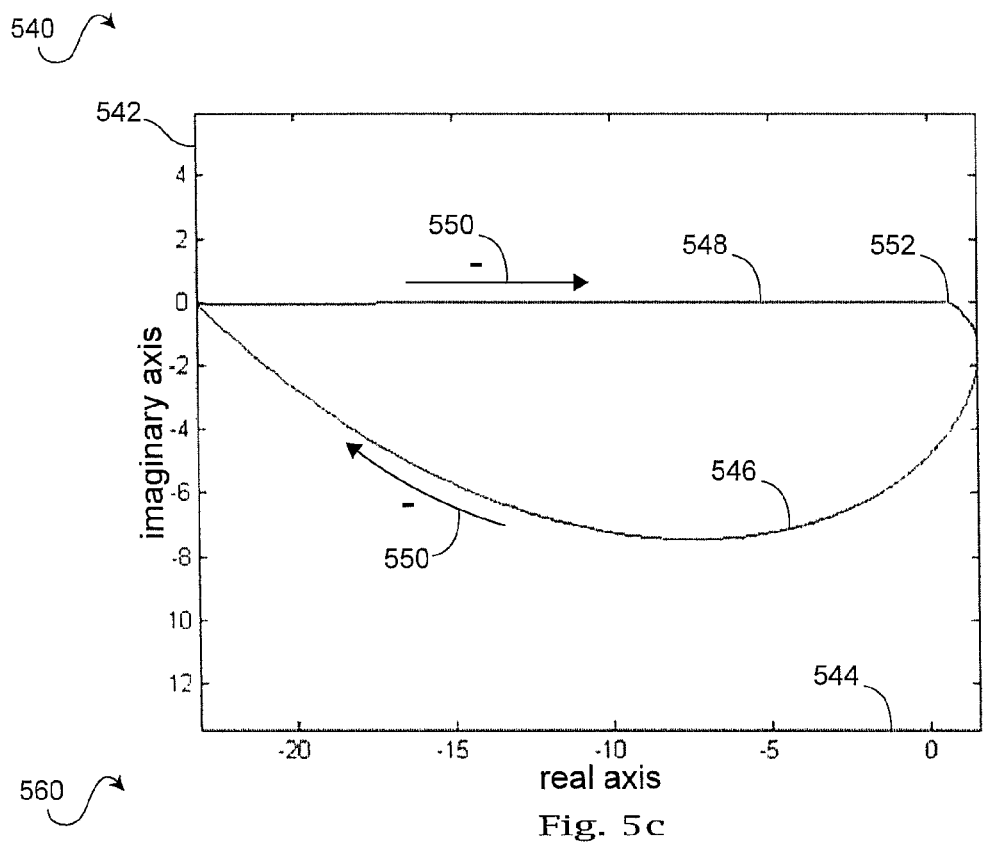
FIG. 5c illustrates an exemplary graph plotted in the complex plane of a signal generated by an exemplary embodiment with positive time direction and negative direction of rotation.

FIG. 5c shows a plot 540 in the complex plane of an exemplary embodiment of a signal with positive time direction and negative rotation. The plot shows an imaginary axis 542 and a real axis 544. The head 546 of the signal may include an increasing spiral. The tail 548 of the signal may return the channel to its pre-signal conditions. Arrows 550 indicate the direction of time, and point 552 indicates the starting point of the signal in the complex plane.

Figure 5D:
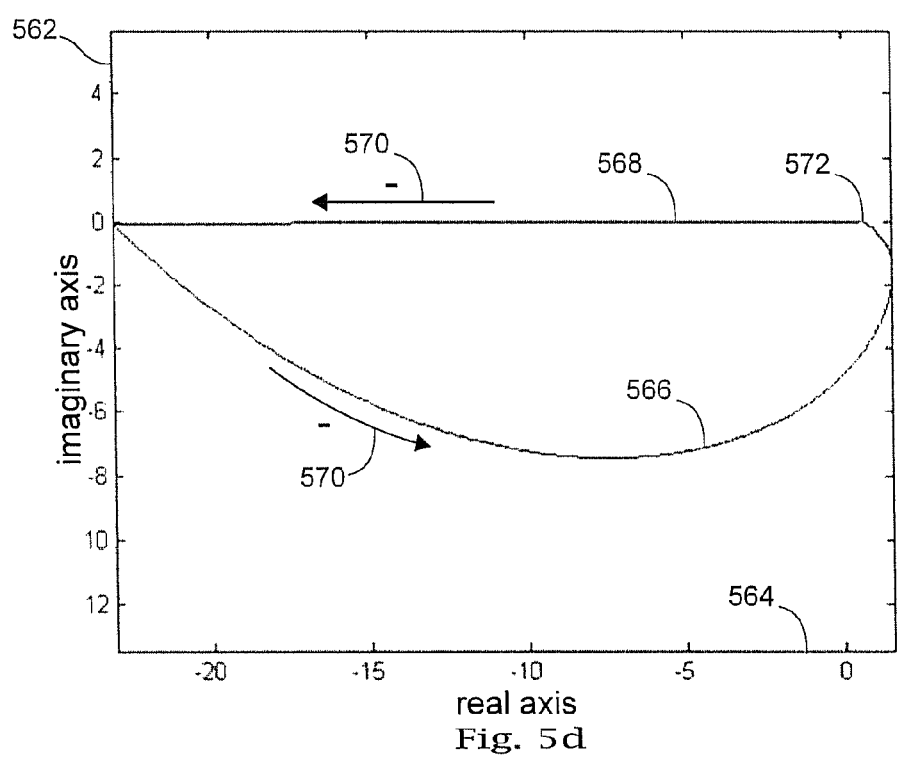
FIG. 5d illustrates an exemplary graph plotted in the complex plane of a signal generated by an exemplary embodiment with negative time direction and negative direction of rotation.

FIG. 5d shows a plot 560 in the complex plane of an exemplary embodiment of a signal with negative time direction and negative rotation. The plot shows an imaginary axis 562 and a real axis 564. The head 566 of the signal may include a decreasing spiral. The tail 568 of the signal may raise the channel from its pre-signal conditions. Arrows 570 indicate the direction of time, and point 572 indicates the starting point of the signal in the complex plane.

FIG. 5a-5d depict exemplary symbol waveforms in which half of the symbol time is given to the head function, and half to the tail function. This is purely exemplary for clarity of presentation. Some applications may use a shorter tail function, which may provide better signal differentiation. Further, the use of a linear tail function in FIG. 5a-5d is exemplary and intended to provide a clear visual differentiation between the head and tail function. Some applications may use a tail function providing a smoother transition, such as a sigmoidal or exponential.

As previously discussed, for signaling techniques that are based on a complex circle, such as the QAM technique, time reversal and rotational reversal are the same thing. In the absence of amplitude growth information, one may not distinguish rotational reversal from time reversal. This may be indicated by exemplary FIG. 3, in which time reversal and rotational reversal are identical. However, rotational reversal by itself is definable on a circle.

Despite the fact that the QAM technique is based on circular motion in the complex plane, the QAM technique may not be able to use rotational reversal to increase its data rate or improve noise resistance. Firstly, the signal formula used in the QAM technique ("QAM signal formula") inherently discards rotational information. Secondly, superimposed transmission used in the QAM technique removes rotational information. These considerations are explained below.

To make a comparison of rotational information between the general spiral formula given in Equation 4 and the QAM signal formula, one may examine the special case of the general spiral formula in which m=2. This corresponds to the QAM condition of signals without amplitude growth. Matching the QAM amplitude and phase modulation properties by letting $\omega_0$ and $\kappa_0$ assume multiple values, Equation 4 may be reduced to the form, $$f_2(t) = \kappa_0 e^{i\omega_0} e^{it} \tag{11}$$

Here, the effect of reversal may be clearly distinguished. Positive rotation yields, $$f_2(t) = \kappa_0 e^{i\omega_0} e^{it} = \kappa_0 e^{i\omega_0}(\cos(t) + i \cdot \sin(t)) \tag{12}$$

and negative rotation yields, $$f_2(-t) = \kappa_0 e^{i\omega_0} e^{-it} = \kappa_0 e^{i\omega_0}(\cos(t) - i \cdot \sin(t)) \tag{13}$$

However, the QAM signal formula does not allow for this distinction to be made. From the QAM signal formula, $$s(t) = I\cos(\omega t) + Q\sin(\omega t) \tag{14}$$

one cannot distinguish between a rotational reversal, $-\omega t$, and a sign reversal of the imaginary component, $-Q$, because of the anti-symmetry of the sine function, $$-Q\sin(\omega t) = Q\sin(-\omega t) \tag{15}$$

The QAM signal formula could avoid this problem by not allowing Q to assume negative values, reserving the sign for rotations. But this would have the effect of making signals generated using the QAM signal formula more difficult to distinguish from each other (it would correspond to not using the bottom half of the constellation diagram of signals generated using the QAM signal formula) and would therefore increase the bit error rate.

Essentially, the general spiral formula may use a polar formulation that preserves rotational information, whereas the QAM signal formula uses a Cartesian formulation that removes it.

As previously discussed, for the special case m=2, corresponding to a circle, there is no distinction between time reversal and rotational reversal. For any higher value of m, however, time and rotational reversal are distinct, as was shown geometrically in FIG. 5a-5d.

The difference between time and rotational reversal may also be examined algebraically, for example, using m=3. The value m=3 is special in that it causes the cosine and sine factors in Equation 1 to be equal. However, the same general spiral properties hold for any m>2.

The following configuration, $$\kappa_0=1; \kappa_1=\pm 1; \kappa_2=\pm 1; \omega_0=\omega_1=\omega_2=0; m=3 \tag{16}$$

for Equation 4, yields, $$f_3(t) = e^{\pm ti \pm (2^{2-3})} \tag{17}$$

Again using the Equation 7 and Equation 8 identities, this becomes, $$f_3(t) = e^{\pm 1 \omega t/\sqrt{2}} e^{\pm 2i \omega t/\sqrt{2}} \tag{18}$$

Here, the ± operators are subscripted to emphasize that (unlike for Equation 10) they are independent of each other, allowing for four possibilities, $$f_3(t) = e^{\omega t/\sqrt{2}} e^{i \omega t/\sqrt{2}} \tag{19}$$

$$f_3(t) = e^{-\omega t/\sqrt{2}} e^{i \cdot t/\sqrt{2}} \tag{20}$$

$$f_3(t) = e^{\omega t/\sqrt{2}} e^{-i \omega t/\sqrt{2}} \tag{21}$$

$$f_3(t) = e^{-\omega t/\sqrt{2}} e^{-i \omega t/\sqrt{2}} \tag{22}$$

Equations 19-22 represent the four possible combinations of time reversal and rotational reversal. Viewed as equations, they may be distinguished from each other. Whether an implementation of the general spiral formula supports both time and rotational reversal, and therefore four times as many signals as QAM for the same channel conditions, may depend on the technical aspects of how signal transmission is performed.

This leads to the second reason that rotational reversal may not work for the QAM technique, namely that QAM superimposed transmission removes rotational information.

"Superimposed transmission" may refer to summing the cosine and sine components of a signal obtained using the QAM technique and transmitting the sum. The orthogonality of the cosine and sine functions may allow them to be separated by the receiver.

An advantage of superposition may be time efficiency, compared to sending the cosine and sine components separately using the same symbol time individually for each. There are, however, two disadvantages of superposition. Firstly, superposition inherently reduces information throughput by one bit per symbol. Secondly, superposition reduces power efficiency. Indeed, the superimposed sum has a higher amplitude than either component individually by a factor of √2. This means that each component may have to use a lower amplitude than the channel would in principle allow, thus increasing noise susceptibility.

The reduction of information throughput from superposition arises from the following identity, $$\cos(t) + \sin(t) = \cos\left(\frac{\pi}{2} - t\right) + \sin\left(\frac{\pi}{2} - t\right) \tag{23}$$

This identity indicates that superposition may not distinguish between an angle that produces a high value of cos(t) with a low value of sin(t), or the converse. The identity may be proven by applying standard identities to the right side of Equation 23, as follows.

Using the sum of angle trigonometric identities, $$\cos(\alpha+\beta) = \cos(\alpha)\cos(\beta) - \sin(\alpha)\sin(\beta) \tag{24}$$

and, $$\sin(\alpha+\beta) = \cos(\alpha)\sin(\beta) + \sin(\alpha)\cos(\beta) \tag{25}$$

the right side of Equation 23 becomes, $$\cos\left(\frac{\pi}{2} - t\right) + \sin\left(\frac{\pi}{2} - t\right) = \tag{26}$$
$$\cos\left(\frac{\pi}{2}\right)\cos(-t) - \sin\left(\frac{\pi}{2}\right)\sin(-t) + \cos\left(\frac{\pi}{2}\right)\sin(-t) + \sin\left(\frac{\pi}{2}\right)\cos(-t)$$

Which simplifies to, $$\cos\left(\frac{\pi}{2} - t\right) + \sin\left(\frac{\pi}{2} - t\right) = 0 - 1\sin(-t) + 0 + 1\cos(-t) = \sin(t) + \cos(t) \tag{27}$$

One way of viewing Equation 23 is that superposition cannot tell a negative rotation from a phase shift of π/2. This may be seen from the following special case of Equation 23:

$$\cos(-t) + \sin(-t) = \cos\left(t + \frac{\pi}{2}\right) + \sin\left(t + \frac{\pi}{2}\right) \tag{28}$$

Therefore, even if the QAM technique did not inherently discard rotational information, it would lose it in superimposed transmission.

If superimposed transmission is used, the general spiral formula is similarly affected. Yet, the general spiral formula differs from the QAM signal formula in at least two ways.

First, even with superimposed transmission, the general spiral formula supports time reversal—and the QAM signal formula does not—because the amplitude variation over time is not affected by superposition.

Second, an implementation of the general spiral formula may use rotational reversal with superimposed transmission as long as phase modulation is not also used. For QAM, signal generation requires phase shifts; for an implementation of the general spiral formula, it does not. Signals may also be generated by selecting different m values, as described in U.S. Patent Application Publication No. 2011/0150048, herein incorporated by reference.

Finally, superposition may not be the only means of transmitting signals. "Two-component transmission" may also be possible.

Superposition is an example of what may be called "one-component transmission": representing a signal (in the case of the QAM technique or the general spiral formula, a two-dimensional signal) with a single series of values.

"Two-component transmission" may include transmitting both the cosine and sine components independently. Further, intra-symbol time multiplexing may be used. In intra-symbol multiplexing, the cosine and sine components may be transmitted one after the other. Two-component transmission and intra-symbol multiplexing may be used with the general spiral formula to send rotationally-reversed signals. Two-component transmission may be used to transmit transmittable waveforms using periodic or non-periodic functions.

Aside from enabling rotational reversals, two-component transmission may be helpful for noise resistance, in at least three ways.

The first advantage of two-component transmission for noise resistance is that two-component transmission may allow the receiver to take a high number of samples per symbol, and to use this oversampling to average out channel noise. This is not possible with superposition, since the intermingling of real and imaginary data allows for only four possible sampling points per cycle, at the points where the real or imaginary value is known to be zero so the other may be determined unambiguously.

The second advantage of two-component transmission for noise resistance, particularly valuable for channels with non-linear properties, is that it may make possible the use of techniques described in U.S. Patent Application Publication No. 2011/0150048, herein incorporated by reference, that require the clear separation between real and imaginary data to analyze signal shape properties.

The third advantage of two-component transmission for noise resistance, discussed below, is that it may improve signal power efficiency by a factor of two.

There may be a large reduction in data rate if two-component transmission involves sending each component individually in the same time interval as a superimposed signal. However, if the sampling rate is sufficient, it may be possible to transmit each component in half the time, keeping the overall symbol time interval constant. For example, one portion of a signal may correspond to one symbol, while another portion of the signal may correspond to another symbol. It may also be possible to send each component in a quarter of the time (or smaller fractions or divisions, regular or irregular) thus increasing the data rate when compared to conventional modulation techniques such as the QAM technique. This may be used to enable two or more symbols to be transmitted within the same symbol time interval that the QAM technique and similar techniques require to transmit a single symbol.

An implementation of the general spiral formula may support a much more power-efficient signal transmission technique than superposition using the QAM technique. As previously mentioned, superposition using the QAM technique reduces component amplitude by a factor of $1/\sqrt{2}$. This arises as follows.

The QAM (superimposed) signal formula, $$s(t) = I \cos(\omega t) + Q \sin(\omega t) \tag{29}$$

is equivalent to the following, $$s(t) = \sqrt{I^2 + Q^2} \left[ \frac{I}{\sqrt{I^2 + Q^2}} \cos(\omega t) + \frac{Q}{\sqrt{I^2 + Q^2}} \sin(\omega t) \right] \tag{30}$$

Since $$\frac{I}{\sqrt{I^2 + Q^2}} \text{ and } \frac{Q}{\sqrt{I^2 + Q^2}}$$

square to one, they may be viewed as the sine and cosine of some angle $\alpha$. This yields, $$s(t) = \sqrt{I^2 + Q^2} [\sin(\alpha) \cos(\omega t) + \cos(\alpha) \sin(\omega t)] \tag{31}$$

which is equivalent to, $$s(t) = \sqrt{I^2 + Q^2} [\sin(\omega t + \alpha)] \tag{32}$$

The amplitude in the QAM (superimposed) signal formula may be greater than either the I or Q components separately. The maximum occurs when I=Q, in which case the superimposed magnitude is greater than either component magnitude individually by a factor of $\sqrt{2}$.

Because superposition using the QAM technique has to "leave room" for this case, each component individually may be no more than $1/\sqrt{2}$ of the maximum channel amplitude. This decrease in component amplitude of course increases noise vulnerability.

With an implementation of the general spiral formula, the same information may be conveyed without this $1/\sqrt{2}$ reduction. This follows immediately for two-component transmission, since no superposition is required.

This may also be true for one-component transmission, because for an implementation of the general spiral formula, superposition is equivalent to simply phase shifting either component. Thus, it is sufficient to transmit either component (optionally with a phase shift). This may be seen by analyzing the superposition of an implementation of the general spiral formula, as follows.

For ease of comparison with the QAM signal formula, a version of the general spiral formula is used with m=2, which corresponds to the condition of no signal growth in the QAM technique.

Starting with Equation 12, adding the cosine and sine components provides, $$\kappa_0 e^{i\omega_0}(\cos(t) + \sin(t)) \tag{33}$$

Using trigonometric identities similar to those used above, this is equivalent to, $$\kappa_0 e^{i\omega_0}\sqrt{2}((1/\sqrt{2})\cos(t) + (\pi/4)\sin(t)) \tag{34}$$

$$\sqrt{2}\kappa_0 e^{i\omega_0}(\sin(\pi/4)\cos(t) + \cos(\pi/4)\sin(t)) \tag{35}$$

$$\sqrt{2}\kappa_0 e^{i\omega_0}(\sin(t + \pi/4)) \tag{36}$$

Equation 36 is simply the general spiral formula sine component phase-shifted by a constant $\pi/4$ and scaled by a factor of $\sqrt{2}$. No new information may be gained by superposition of an implementation of the general spiral formula, when compared to transmitting either component individually. This differs from the QAM signal detection.

The simplicity of Equation 36 arises because the general spiral formula assigns the same amplitude to both components; both contain the same information. Whereas the QAM technique stores information in independent amplitude weights to the cosine and sine components, the general spiral formula uses a polar formulation with a common amplitude and phase. This information is available to either component individually.

Since power is proportional to the square of amplitude, an implementation of the general spiral formula's advantage of a factor of a square root of two in amplitude over the QAM technique in single-component transmission is equivalent to a power advantage of a factor of two.

For illustrative purposes, an exemplary implementation of time reversal with two-component transmission is described below and compared to techniques known to the art.

It may be desired to design a communication system supporting eight possible symbols available for transmission. Techniques known to the art might produce a special case of the QAM technique, known as "8-PSK" (Phase Shift Keying), in which the eight symbols are represented by eight complex numbers all having equal amplitude, phase shifted from each other by $\pi/4$ around a complex circle. These eight complex numbers may be used to define the initial phase of eight pairs of cosine and sine waves at the required transmission frequency over one cycle. Known techniques would then use superimposed transmission, representing each symbol by the sum of its associated cosine and sine waves. A raised cosine filter (or square root raised cosine filter) may be used to control the frequency spread of the superimposed wave and to reduce ICI. The signal receiver could deduce the transmitted symbol by sampling at special points that allow the cosine and sine data to be extracted from the superimposed wave. For superimposed data, the cosine values may only be read unambiguously when the sine data is zero, and vice-versa. This provides at most two cosine and two sine data points per cycle.

An exemplary embodiment of a method for communicating may instead use a set of eight communication symbols mapped to eight complex spirals, or to eight non-periodic functions known in the art. In an exemplary embodiment, of a method for communicating, four complex spirals, phase shifted from each other by $\pi/2$ and with a shape modulation factor, may use m=2.4. These four complex spirals may be used to generate four pairs of real and imaginary waves at the required frequency over half a cycle for each of the real and imaginary waves. Using time-multiplexing, four waveforms may be generated by sequencing each symbol's real wave followed by its paired imaginary wave, producing a combined wave of the same duration as a superimposed 8-PSK waveform. The number of symbols may be doubled from four to eight, matching 8-PSK, by using time reversal: for each of the four combined waveforms as described above, a new waveform may be created by sequencing the time-reversed real wave by the time-reversed imaginary wave. A Gaussian filter may be used to control the frequency spread of the combined waveforms. The signal receiver may over-sample the received real and imaginary data to reduce noise and identify the transmitted signals using the technique of matched filters known to the art.

8-PSK uses a raised cosine filter, whereas an exemplary embodiment of a method for communicating described above may use a Gaussian filter. The Gaussian filter may have advantages over a raised cosine filter, in terms of ICI, power, complexity of implementation, and ISI averaged over multiple samples. 8-PSK is forced to use a raised cosine filter because it minimizes ISI for the single point at which the 8-PSK receiver extracts signal data.

Since an exemplary embodiment of a method for communicating has real and imaginary data unambiguously separated from each other, it is not limited in its ability to sample the signal multiple times in the receiver. An exemplary embodiment may therefore control for noise more effectively than 8-PSK by over-sampling in the receiver, while achieving the advantages associated with using a Gaussian rather than raised cosine filter.

Techniques of matched filter signal detection known in the art may be optimal for communication channels whose only distortion is Additive White Gaussian Noise (AWGN). Their effectiveness, however, may depend on the ability to extract multiple data points, which may be facilitated by the time-multiplexing method described above. Signal detection techniques for non-AWGN channels are described in U.S. Patent Application Publication No. 2011/0150048, herein incorporated by reference.

Figure 6:
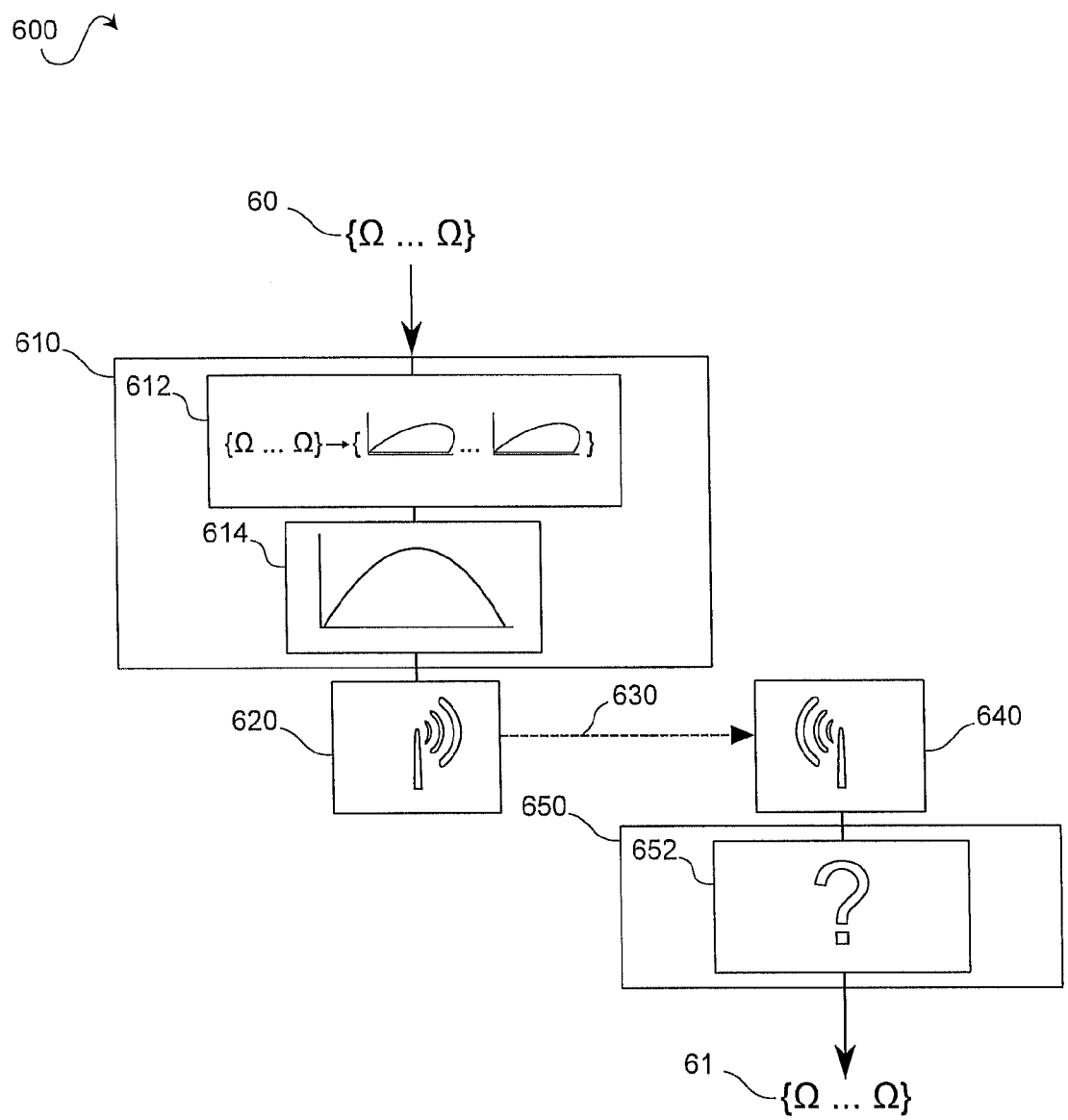
FIG. 6 illustrates an exemplary embodiment of a system for communicating.

FIG. 6 shows an exemplary embodiment 600 of a system for communicating, which may include a modulator 610, a transmitter or transceiver 620, a communication channel 630, a receiver or transceiver 640, and a demodulator 650. The demodulator 650 may include a decoder 652. The modulator 610 may include an encoder 612 and a pulse-shaping filter 614. A plurality of input communication symbols 60 may be obtained from a set of communication symbols, converted into a plurality of transmittable waveforms using a modulator 610 and using a plurality of functions selected from a set of non-periodic functions, and transmitted over a communication channel 630 using a transmitter or transceiver 620.

Input communication symbols may be, for example, stored in the modulator 610, or obtained from or supplied by an electronic device. The non-periodic functions may be, for example, stored in the modulator 610 or obtained from an electronic device.

The transmittable waveforms may be received using receiver or transceiver 640, and demodulated using demodulator 650 to yield a plurality of output communication symbols 61. Output communication symbols may be, for example, communicated to a user or an electronic device.

An electronic device may include a computer-readable media, a computer, a satellite communication device, and/or a mobile device, such as a personal digital assistant, a laptop computer, or cellular telephone. The electronic device, for example, may store, convert, process, transmit, receive, communicate to a user, and/or otherwise manage, communication symbols data, non-periodic functions data, and/or transmittable waveforms. Any of the above components, including the modulator 610, the transmitter or transceiver 620, the receiver or transceiver 640, the demodulator 650, and the electronic device, may include one or more processors and computer-readable media, as known to one having ordinary skill in the art.

Figure 7:
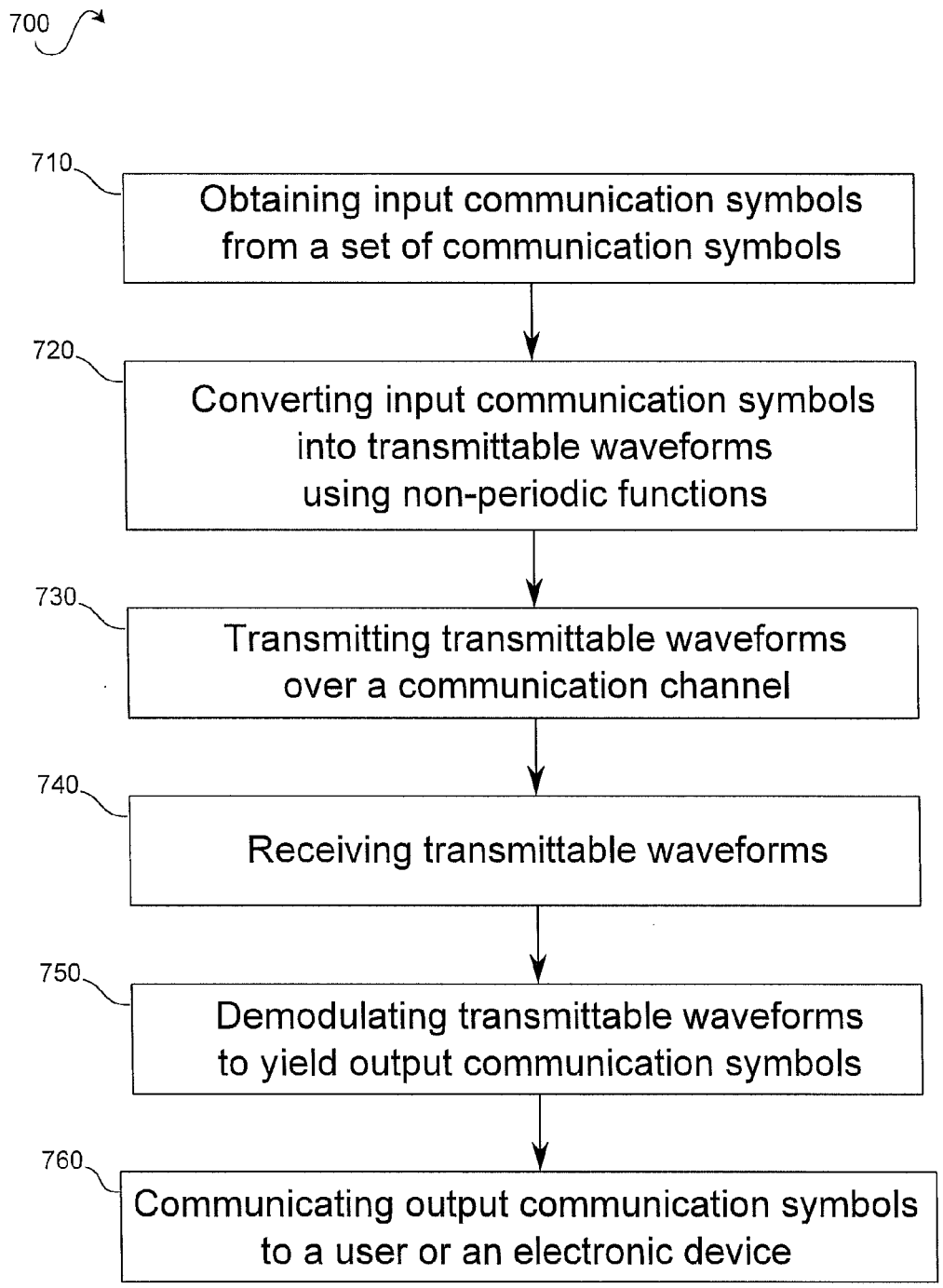
FIG. 7 illustrates an exemplary embodiment of a method for communicating.

FIG. 7 shows an exemplary embodiment 700 of a method for communicating, which may include obtaining a plurality of input communication symbols selected from a set of communication symbols at step 710, converting the plurality of input communication symbols into a plurality of transmittable waveforms constructed using functions at step 720, transmitting the plurality of transmittable waveforms over a communication channel at step 730, receiving the plurality of transmittable waveforms at step 740, demodulating the plurality of transmittable waveforms at step 750, and communicating a set of output communication signals to a user or to an electronic device at step 760.

At step 710, a plurality of input communication symbols may be obtained using a modulator and/or an electronic device. The input communication symbols may be selected from a set of communication symbols. For example, the set of input communication symbols may contain eight communication symbols. The electronic device may include a computer-readable media, a computer, a satellite communication device, and/or a mobile device, such as a personal digital assistant, a laptop computer, or cellular telephone.

At step 720, the plurality of input communication symbols may be converted into a plurality of transmittable waveforms using a modulator. The waveforms may be constructed using functions, including but not limited to Equation 3. The functions may be selected from a set of non-periodic functions. The non-periodic functions may be either stored in a modulator or obtained from an electronic device. The set of non-periodic functions may be mapped to, or may correspond to, a set of communication symbols. The electronic device may include a computer-readable media, a computer, a satellite communication device, and/or a mobile device, such as a personal digital assistant, a laptop computer, or cellular telephone.

The modulator may include an encoder to convert a plurality of input communication symbols into amplitude data and a pulse-shaping filter to band-limit the signal. The encoder may convert a plurality of communication symbols into amplitude data by (1) retrieving digital amplitude data from a lookup table indexed by symbol numbers, (2) producing an analog waveform equivalent to the symbol sequence using analog devices familiar to the art, or (3) using any other encoding technique known in the art. The pulse-shaping filter may be a Gaussian filter or any other filter known in the art.

A lookup table may map the set of non-periodic functions to the set of communication symbols. For example, a lookup table may include values for a non-periodic function $\{F_j(t)\}$. The selection of $\{F_j(t)\}$ may be based on the consideration of channel properties such as noise and available amplitude and frequency range, as well as optimization criteria. For example, $\{F_j(t)\}$ may be selected to maximize the difference between their signal-detection matched filters, subject to limitations on the number of allowable samples, power usage, and modulator and demodulator chip complexity. A unique numeric code, such as binary codes, may be assigned by a processor for each $F_j(t)$, which are agreed upon by a transmitter or transceiver and a receiver or transceiver.

$\{F_j(t)\}$ may be based on Equation 3. Unique numeric codes may be determined as a function of amplitude, phase, time direction, frequency, rotational direction, and/or growth. For example, unique numeric codes may be determined by varying phase ($\omega_0$ in Equation 4), growth (m in Equation 4), and time direction ($\kappa_1$ or $\omega_1$ in Equation 4). Alternatively, any type of non-periodic waveforms may be used.

Using the unique numeric codes, the plurality of input communication symbols may be converted into an equivalent sequence of non-periodic functions selected from $\{F_j(t)\}$, and a plurality of waveforms may be generated using a transmitter or transceiver.

At step 730, the plurality of transmittable waveforms may be transmitted over a communication channel using a transmitter or a transceiver. The plurality of transmittable waveforms may be transmitted through air, fiber optic cable, or any other media known in the art. The communication channel may suffer from noise, fading, distortion or any other channel impairments known in the art.

Two-component transmission may be used, as it may facilitate the use of rotational reversal. Further, two-component intra-symbol time-multiplexing may be used to facilitate over-sampling of signal data, which may be used to average out noise.

Further, different portions of a transmittable waveform may correspond to different symbols. This may allow for a higher data rate when compared to conventional modulation techniques, such as the QAM technique.

Further, symbol rate may be increased by reducing the two-component intra-symbol time-multiplexing for each of the real and imaginary components of a symbol's transmitted amplitudes.

Power properties of a transmitted signal may be changed by manipulating the crest factor of a signal in order to change its power properties. For example, the crest factor may be manipulated by multiplying a sinusoidal waveform by an exponential waveform, and/or by adjusting the "m" parameter in the general spiral formula.

The transition between symbols may be smoothed by splitting symbol transmission data into head and tail functions between symbols.

At step 740, the plurality of transmittable waveforms may be received using a receiver or transceiver.

At step 750, the plurality of transmittable waveforms may be demodulated using a demodulator. The demodulator 130 may include a decoder 132. The plurality of transmittable waveforms may be broken down into amplitude data intervals corresponding to each symbol. The receiver or transceiver may sample the transmitted waveforms and determine which "j" was sent by look-up in a pre-computed table of values for $\{F_j(t)\}$. The transmitted waveform may be decoded by a processor from the relationship between the "j" values and unique numeric codes.

Alternatively, for channels including primarily Additive White Gaussian Noise (AWGN), signal-detection-matched filter techniques known in the art may be used to convert a signal amplitude data into a sequence of received symbols. For channels with other impairments, other filtering techniques may be used in addition to or in lieu of signal-detection-matched filters. These other techniques may include those described in U.S. Patent Application Publication No. 2011/0150048, herein incorporated by reference.

At step 760, a set of output communication signals may be communicated to an electronic device or to a user. An electronic device may include a computer-readable media, a computer, a satellite communication device, and/or a mobile device, such as a personal digital assistant, a laptop computer, or cellular telephone.

In other exemplary embodiments, an electronic device, for example, may store, convert, process, transmit, receive, communicate to a user, and/or otherwise manage, communication symbols data, non-periodic functions data, and/or transmittable waveforms.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments may be made by those skilled in the art without departing from the scope of the invention as defined by the following claims.

What is claimed is:

1. A method for communicating comprising:
   obtaining one or a plurality of input communication symbols selected from a set of communication symbols;
   converting the one or a plurality of input communication symbols into one or a plurality of transmittable waveforms using one or a plurality of non-periodic functions selected from a set of non-periodic functions; and
   transmitting the one or a plurality of transmittable waveforms over a communication channel,
   wherein at least one non-periodic function selected from the set of non-periodic functions has a form of equation $$f_m(t) = [\kappa_0 e^{i\omega_0}] e^{[\kappa_1 e^{i\omega_1}](t+t_0)i[\kappa_2 e^{i\omega_2}](2^{2-m})},$$

wherein $\kappa_0$ is a first level amplitude coefficient, $\omega_0$ is a first level frequency constant, i is an imaginary constant square root of minus one, $\kappa_1$ is a second level amplitude coefficient, $\omega_1$ is a second level frequency constant, t is a time parameter, $t_0$ is an initial time, $\kappa_2$ is a third level amplitude coefficient, $\omega_2$ is a third level frequency constant, and m is a waveform shape term.

2. The method for communicating of claim 1, wherein $\kappa_0$ modulates an amplitude, $\omega_0$ modulates a phase, $\kappa_1$ modulates a frequency, at least one of $\kappa_1$ and $\omega_1$ vary a time direction, $t_0$ vary a time shift, at least one of $\kappa_2$ and $\omega_2$ vary a rotational direction, and at least one of m, $\kappa_2$, $\omega_1$ and $\omega_2$ vary a growth.

3. The method for communicating of claim 1, wherein each non-periodic function in the set of non-periodic functions differs from other non-periodic functions in the set of non-periodic functions by at least one of an amplitude, a phase, a frequency, a time direction, a time shift, a rotational direction, and a growth.

4. The method for communicating of claim 1, wherein at least one of the one or a plurality of input communication symbols and the set of non-periodic functions is obtained from at least one of a modulator, a computer-readable media, a computer, a satellite communication device and a mobile device.

5. The method for communicating of claim 1, wherein one or a plurality of portions of at least one of the one or a plurality of transmittable waveforms corresponds to at least one of the one or a plurality of input communication symbols.

6. The method for communicating of claim 1, wherein the one or a plurality of transmittable waveforms is at least one of generated and transmitted over the communication channel using two-component transmission.

7. The method for communicating of claim 6, wherein the one or a plurality of transmittable waveforms is at least one of generated and transmitted over the communication channel further using intra-symbol time multiplexing.

8. The method for communicating of claim 1, wherein at least one of the one or a plurality of transmittable waveforms comprises a head portion and a tail portion, such that the tail portion returns the communication channel to initial conditions.

9. The method for communicating of claim 1, wherein the one or a plurality of input communication symbols is converted into the one or a plurality of transmittable waveforms using a modulator.

10. The method for communicating of claim 9, wherein the modulator comprises at least one of an encoder and a pulse-shaping filter.

11. The method for communicating of claim 10, wherein the encoder obtains amplitude data using a lookup table mapping the set of communication symbols to the set of non-periodic functions.

12. The method for communicating of claim 1, wherein the one or a plurality of transmittable waveforms is at least one of generated and transmitted over the communication channel using at least one of a transmitter and a transceiver.

13. The method for communicating of claim 1, wherein the one or a plurality of transmittable waveforms is at least one of generated and transmitted over the communication channel using at least one of a computer, a satellite communication device and a mobile device.

14. The method for communicating of claim 1, further comprising:
receiving the one or a plurality of transmittable waveforms; and
demodulating the one or a plurality of transmittable waveforms.

15. The method for communicating of claim 14, further comprising communicating one or a plurality of output communication symbols to at least one of a user, a computer-readable media, a computer, a satellite communication device and a mobile device.

16. The method for communicating of claim 14, wherein the one or a plurality of transmittable waveforms is received using at least one of a receiver and a second transceiver.

17. The method for communicating of claim 14, wherein the one or a plurality of transmittable waveforms is received using at least one of a computer, a satellite communication device and a mobile device.

18. The method for communicating of claim 14, wherein the one or a plurality of transmittable waveforms is demodulated using a demodulator.

19. The method for communicating of claim 18, wherein the demodulator comprises a decoder.

20. A method for communicating comprising:
receiving one or a plurality of transmittable waveforms transmitted over a communication channel; and
demodulating the one or a plurality of transmittable waveforms,
wherein the one or a plurality of transmittable waveforms are constructed using one or a plurality of non-periodic functions selected from a set of non-periodic functions, and
wherein at least one non-periodic function selected from the set of non-periodic functions has a form of equation $$f_m(t) = [\kappa_0 e^{i\omega_0}] e^{[\kappa_1 e^{i\omega_1}](t+t_0)i[\kappa_2 e^{i\omega_2}](2^{2-m})},$$

wherein $\kappa_0$ is a first level amplitude coefficient, $\omega_0$ is a first level frequency constant, i is an imaginary constant square root of minus one, $\kappa_1$ is a second level amplitude coefficient, $\omega_1$ is a second level frequency constant, t is a time parameter, $t_0$ is an initial time, $\kappa_2$ is a third level amplitude coefficient, $\omega_2$ is a third level frequency constant, and m is a waveform shape term.

21. The method for communicating of claim 20, further comprising communicating one or a plurality of output communication symbols to at least one of a user, a computer-readable media, a computer, a satellite communication device and a mobile device.

22. The method for communicating of claim 20, wherein $\kappa_0$ modulates an amplitude, $\omega_0$ modulates a phase, $\kappa_1$ modulates a frequency, at least one of $\kappa_1$ and $\omega_1$ vary a time direction, $t_0$ vary a time shift, at least one of $\kappa_2$ and $\omega_2$ vary a rotational direction, and at least one of m, $\kappa_2$, $\omega_1$ and $\omega_2$ vary a growth.

23. The method for communicating of claim 20, wherein each non-periodic function in the set of non-periodic functions differs from other non-periodic functions in the set of non-periodic functions by at least one of an amplitude, a phase, a frequency, a time direction, a time shift, a rotational direction, and a growth.

24. The method for communicating of claim 20, wherein one or a plurality of portions of at least one of the one or a plurality of transmittable waveforms corresponds to at least one of one or a plurality of input communication symbols.

25. The method for communicating of claim 20, wherein the one or a plurality of transmittable waveforms is at least one of generated and transmitted over the communication channel using two-component transmission.

26. The method for communicating of claim 25, wherein the one or a plurality of transmittable waveforms is at least one of generated and transmitted over the communication channel further using intra-symbol time multiplexing.

27. The method for communicating of claim 20, wherein at least one of the one or a plurality of transmittable waveforms comprises a head portion and a tail portion, such that the tail portion returns the communication channel to initial conditions.

28. The method for communicating of claim 20, wherein the one or a plurality of transmittable waveforms is received using at least one of a receiver and a transceiver.

29. The method for communicating of claim 20, wherein the one or a plurality of transmittable waveforms is received using at least one of a computer, a satellite communication device and a mobile device.

30. The method for communicating of claim 20, wherein the one or a plurality of transmittable waveforms is demodulated using a demodulator.

31. The method for communicating of claim 30, wherein the demodulator comprises a decoder.

32. A system for communicating comprising:
a modulator adapted to obtain one or a plurality of input communication symbols selected from a set of communication symbols, and to convert the one or a plurality of input communication symbols into one or a plurality of transmittable waveforms using one or a plurality of non-periodic functions selected from a set of non-periodic functions; and
at least one of a transmitter and a first transceiver adapted to transmit the one or a plurality of transmittable waveforms over a communication channel,
wherein at least one non-periodic function selected from the set of non-periodic functions has a form of equation $$f_m(t) = [\kappa_0 e^{i\omega_0}]e^{[\kappa_1 e^{i\omega_1}](t+t_0)i[\kappa_2 e^{i\omega_2}](2^{2-m})}.$$

wherein $\kappa_0$ is a first level amplitude coefficient, $\omega_0$ is a first level frequency constant, i is an imaginary constant square root of minus one, $\kappa_1$ is a second level amplitude coefficient, $\omega_1$ is a second level frequency constant, t is a time parameter, $t_0$ is an initial time, $\kappa_2$ is a third level amplitude coefficient, $\omega_2$ is a third level frequency constant, and m is a waveform shape term.

33. The system for communicating of claim 32, wherein $\kappa_0$ modulates an amplitude, $\omega_0$ modulates a phase, $\kappa_1$ modulates a frequency, at least one of $\kappa_1$ and $\omega_1$ vary a time direction, $t_0$ vary a time shift, at least one of $\kappa_2$ and $\omega_2$ vary a rotational direction, and at least one of m, $\kappa_2$, $\omega_1$ and $\omega_2$ vary a growth.

34. The system for communicating of claim 32, wherein each non-periodic function in the set of non-periodic functions differs from other non-periodic functions in the set of non-periodic functions by at least one of an amplitude, a phase, a frequency, a time direction, a time shift, a rotational direction, and a growth.

35. The system for communicating of claim 32, wherein at least one of the one or a plurality of input communication symbols and the set of non-periodic functions is obtained from at least one of a modulator, a computer-readable media, a computer, a satellite communication device and a mobile device.

36. The system for communicating of claim 32, wherein one or a plurality of portions of at least one of the one or a plurality of transmittable waveforms corresponds to at least one of the one or a plurality of input communication symbols.

37. The system for communicating of claim 32, wherein the one or a plurality of transmittable waveforms is at least one of generated and transmitted over the communication channel using two-component transmission.

38. The system for communicating of claim 37, wherein the one or a plurality of transmittable waveforms is at least one of generated and transmitted over the communication channel further using intra-symbol time multiplexing.

39. The system for communicating of claim 32, wherein at least one of the one or a plurality of transmittable waveforms comprises a head portion and a tail portion, such that the tail portion returns the communication channel to initial conditions.

40. The system for communicating of claim 32, wherein the modulator comprises an encoder and a pulse-shaping filter.

41. The system for communicating of claim 40, wherein the encoder obtains amplitude data using a lookup table mapping the set of communication symbols to the set of non-periodic functions.

42. The system for communicating of claim 32, further comprising:
at least one of a receiver and a second transceiver adapted to receive the one or a plurality of transmittable waveforms; and
a demodulator adapted to demodulate the one or a plurality of transmittable waveforms.

43. The system for communicating of claim 32, further comprising at least one of a computer-readable media, a computer, a satellite communication device and a mobile device,
wherein the at least one of a computer-readable media, a computer, a satellite communication device and a mobile device is adapted to at least one of:
supply the one or a plurality of input communication symbols;
obtain the one or a plurality of input communication symbols;
convert the one or a plurality of input communication symbols into the one or a plurality of transmittable waveforms;
transmit the one or a plurality of transmittable waveforms over the communication channel;
receive the one or a plurality of transmittable waveforms;
demodulate the one or a plurality of transmittable waveforms; and
communicate one or a plurality of output communication symbols to at least one of a user, a secondary computer-readable media, a secondary computer, a secondary satellite communication device and a secondary mobile device.

44. The system for communicating of claim 42, wherein the demodulator comprises a decoder.

45. A system for communicating comprising:
at least one of a receiver and a transceiver adapted to receive one or a plurality of transmittable waveforms transmitted over a communication channel; and
a demodulator adapted to demodulate the one or a plurality of transmittable waveforms,
wherein the one or a plurality of transmittable waveforms are constructed using one or a plurality of non-periodic functions selected from a set of non-periodic functions, and
wherein at least one non-periodic function selected from the set of non-periodic functions has a form of equation $$f_m(t) = [\kappa_0 e^{i\omega_0}]e^{[\kappa_1 e^{i\omega_1}](t+t_0)i[\kappa_2 e^{i\omega_2}](2^{2-m})}.$$

wherein $\kappa_0$ is a first level amplitude coefficient, $\omega_0$ is a first level frequency constant, i is an imaginary constant square root of minus one, $\kappa_1$ is a second level amplitude coefficient, $\omega_1$ is a second level frequency constant, t is a time parameter, $t_0$ is an initial time, $\kappa_2$ is a third level amplitude coefficient, $\omega_2$ is a third level frequency constant, and m is a waveform shape term.

46. The system for communicating of claim 45, wherein $\kappa_0$ modulates an amplitude, $\omega_0$ modulates a phase, $\kappa_1$ modulates a frequency, at least one of $\kappa_1$ and $\omega_1$ vary a time direction, $t_0$ vary a time shift, at least one of $\kappa_2$ and $\omega_2$ vary a rotational direction, and at least one of m, $\kappa_2$, $\omega_1$ and $\omega_2$ vary a growth.

47. The system for communicating of claim 45, wherein each non-periodic function in the set of non-periodic functions differs from other non-periodic functions in the set of non-periodic functions by at least one of an amplitude, a phase, a frequency, a time direction, a time shift, a rotational direction, and a growth.

48. The system for communicating of claim 45, wherein one or a plurality of portions of at least one of the one or a plurality of transmittable waveforms corresponds to at least one of one or a plurality of input communication symbols.

49. The system for communicating of claim 45, wherein the one or a plurality of transmittable waveforms is at least one of generated and transmitted over the communication channel using two-component transmission.

50. The system for communicating of claim 49, wherein the one or a plurality of transmittable waveforms is at least one of generated and transmitted over the communication channel further using intra-symbol time multiplexing.

51. The system for communicating of claim 45, wherein at least one of the one or a plurality of transmittable waveforms comprises a head portion and a tail portion, such that the tail portion returns the communication channel to initial conditions.

52. The system for communicating of claim 45, further comprising at least one of a computer-readable media, a computer, a satellite communication device and a mobile device,
  wherein the at least one of a computer-readable media, a computer, a satellite communication device and a mobile device is adapted to at least one of:
  receive the one or a plurality of transmittable waveforms;
  demodulate the one or a plurality of transmittable waveforms; and
  communicate one or a plurality of output communication symbols to at least one of a user, a secondary computer-readable media, a secondary computer, a secondary satellite communication device and a secondary mobile device.

53. The system for communicating of claim 45, wherein the demodulator comprises a decoder.

* * * * *